UNITED STATES PATENT OFFICE.

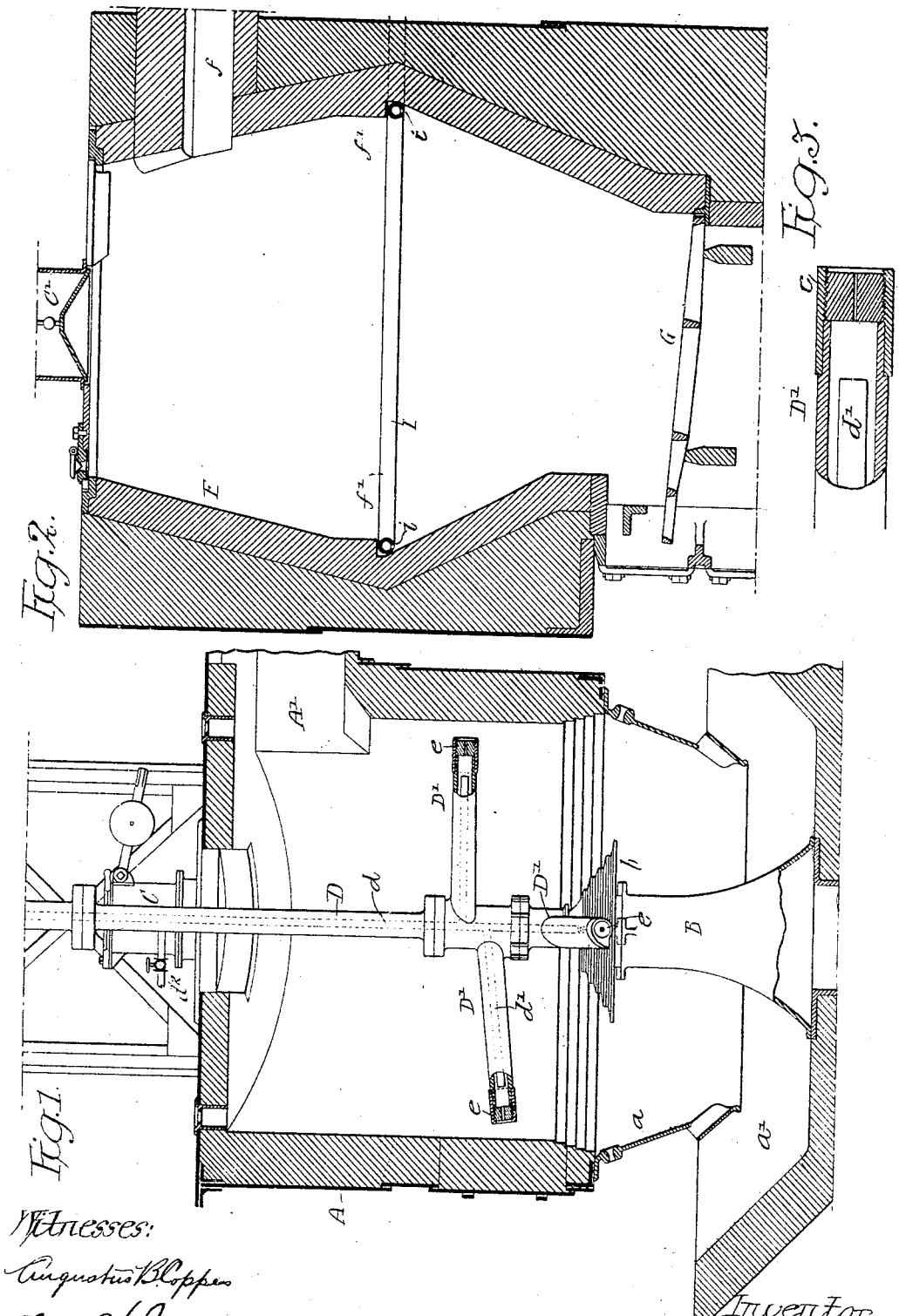

JAMES E. SHEAFFER, OF BURNHAM, PENNSYLVANIA, ASSIGNOR OF ONE-HALF TO ORVILLE C. SKINNER, OF BURNHAM, PENNSYLVANIA.

PROCESS OF PREVENTING THE FORMATION OF CLINKER IN GAS-PRODUCERS.

No. 809,021.     Specification of Letters Patent.     Patented Jan. 2, 1906.

Application filed July 27, 1904. Serial No. 218,357.

*To all whom it may concern:*

Be it known that I, JAMES E. SHEAFFER, a citizen of the United States, residing at Burnham, Pennsylvania, have invented certain Improvements in Processes of Preventing the Formation of Clinker in Gas-Producers, of which the following is a specification.

The object of my invention is to prevent clinker forming on the walls of a gas-producer, which would interfere with the ordinary and continuous operation of the producer. This object I attain by projecting jets or streams of water against the walls of the producer, with the result that material which would otherwise produce clinker and attach itself to the walls is softened and prevented from adhering to the walls, so that it will be fed downward into the ash-hopper with the ashes.

In the accompanying drawings, Figure 1 is a view showing the application of my invention to a producer in which the material is agitated by revolving blades. Fig. 2 is a view showing the application of my invention to a producer of the type in which the material is not agitated by revolving blades, and Fig. 3 is an enlarged sectional view of one of the arms.

My invention can be used in connection with any gas-producer, the object being to prevent the accumulation of clinker on the walls of the producer.

In carrying out my invention I may use it either in connection with a producer with revolving blades which break up and move the clinker out of the heat zone or in connection with a gravity-fed producer in which the agitating-blades are absent.

In the producer shown in Fig. 1 small quantities of water are projected from the rotating arms against the walls of the producer, which will break up the clinker and prevent it adhering to the walls, while in Fig. 2 a water-pipe is situated above the hot zone of the producer and water is allowed to escape from this pipe and trickle down the walls of the producer, breaking up the clinker at the walls, and thus preventing the clinker adhering to them.

I will now proceed to describe in detail the producer shown in Fig 1. A represents the cylindrical body of the producer, $a$ the tapering ash-hopper at the bottom of the same, and $a'$ the water-sealed ash-pit. B is a central air-pipe having an air-distributing head $b$. A' is the gas-outlet of the producer, and C is one of the valved feeders for the fuel. The producer has a central hollow vertical shaft D, provided with projecting hollow arms D', which are situated in the hot zone of the fuel—that is to say, between the bed of ashes in the ash-hopper and the green fuel in the upper portion of the producer. These arms extend very near the walls of the producer and are for the purpose of agitating and stirring the mass of fuel in the producer, so as to insure the proper flow of air therethrough and to break up the clinker that may be formed therein. Each of the arms D' is water-cooled, the water being conveyed thereto through a central pipe $d$ in the hollow shaft D, and branches $d'$ of this pipe extend into the hollow arms D', the water being delivered by these branches to the outer end of each hollow arm and returning through the arms and hollow shaft to a discharge-pipe $d^2$ above the top of the furnace. I find in this type of producer the clinker will form on the walls to such an extent in many instances as to interfere with the rotation of the arms, and, in fact, in some instances stopping the rotation of the arms altogether. Then the clinker has to be cut away before the arms can freely rotate. To overcome this, I form perforations $e$ in the ends of the arms D', so that water escaping from the arms will be projected against the walls of the producer. The water will prevent the accumulation of clinker on the walls of the producer, and, in fact, will tend to break up the clinker, which will be carried down by the rotating arms. This particular form of producer is set forth and claimed in a companion application filed of even date herewith, Serial No. 218,352, as a joint invention by Orville C. Skinner and James E. Sheaffer.

Referring now to Fig. 2, F is the body of another form of producer, shaped as shown in the drawings, having a gas-outlet $f$, a grate G, and a fuel-feeding hopper C'. In this instance a recess $f'$ is formed in the walls of the producer, and a pipe I rests in this recess and has outlets $i$ for the escape of water which is fed into the pipe. This water trickles down the walls of the producer and prevents the formation of clinker, and whether the jets or streams of water are projected at an angle to or parallel with the walls said water is projected into the mass of fuel adjacent to the walls of the producer where clinker usually forms.

Having thus described my invention, I claim and desire to secure by Letters Patent—

1. The mode herein described of preventing the formation of clinker in gas-producers, said mode consisting in injecting jets or streams of water into the incandescent mass of fuel adjacent to the walls of the producer where clinker usually forms, substantially as described.

2. The mode herein described of preventing the formation of clinker on the walls of gas-producers, said mode consisting in projecting jets or streams of water against the walls of the producer at the point where clinker usually forms, substantially as described.

3. The mode herein described of preventing the formation of clinker in a gas-producer, said mode consisting in projecting jets or streams of water into the incandescent mass of fuel in the producer at points adjacent to the walls thereof, and agitating the mass of fuel, substantially as described.

In testimony whereof I have signed my name to this specification in the presence of two subscribing witnesses.

JAMES E. SHEAFFER.

Witnesses:
WM. H. WREN,
CHAS. C. BROWN.